United States Patent Office 3,479,212
Patented Nov. 18, 1969

3,479,212
PROCESS FOR TREATING POLYESTER SHAPED ARTICLES WITH POLYMERIC COMPOUND CONTAINING POLYESTER GROUP AND ACTIVE GROUP IN THE PRESENCE OF SWELLING AGENT FOR POLYESTER
Michael Mundie Robertson and Geoffrey Alan Horsfall, Harrogate, England, assignors to Imperial Chemical Industries Limited, London, England, a corporation of Great Britain
No Drawing. Filed June 28, 1965, Ser. No. 467,745
Claims priority, application Great Britain, July 22, 1964, 29,581/64
Int. Cl. B44d 1/22; C08d 13/24
U.S. Cl. 117—138.8                    18 Claims

ABSTRACT OF THE DISCLOSURE

A process for providing a shaped article made from an essentially linear crystallizable polyester with a durable, modified surface comprising treating the shaped article with a water-insoluble crystallizable polymeric compound, said polymeric compound being characterized in that (A) it has a crystalline melting point above 100° C., measured by the temperature of disappearance of birefringence, (B) it contains crystallizable segments of repeat units identical with the repeat units forming the crystallizable portions of the polyester shaped article, and (C) it contains at least one active group serving to modify the surface of the shaped article, the said active group being selected from at least one of the following: an acidic group, a basic group, an ionisable salt group, a water-solvatable polymeric group, an anti-oxidant group, a group which absorbs ultra-violet light of wavelength 290–400 m$\mu$ and dissipates it in a manner harmless to the shaped article, a group which contains silicon- or fluorine-based water-repellent groups, a dyestuff group, a polymeric group containing a plurality of alcoholic hydroxyl radicals, and a polymeric group containing a plurality of —CO–NH— radicals; the process being carried out in the presence of a swelling agent for the polyester from which the shaped article is made.

---

The present invention relates to a surface-modifying treatment of shaped articles, such as filaments, fibres, fabrics, films and the like, made from synthetic crystallisable polyesters.

Surface treatment of shaped articles made from essentially linear crystallisable polyesters with agents for modifying the properties of the articles, particularly antistatic agents, is well known. There are in general two ways in which such treatment has been carried out: either the agent is permanently attached to the surface by newly-formed covalent bonds, as in the case of radical grafting, certain isocyanate treatments, or the base of acid-catalysed treatments such as those described in copending U.S. application of Sheard, Ser. No. 333,995, filed Dec. 27, 1963, now abandoned or the agent is loosely held by polar or surface tension forces or other relatively low energy forces. Polyesters, because of their relatively non-polar nature, do not develop very high forces with agents for surface-treatment in this second way, consequently it has proved difficult to carry out a surface treatment of polyesters to obtain an effect which is permanent and very resistant towards washing, scouring, dry-cleaning, and other processes to which the derived articles may be subjected. We have now discovered a method of modifying the surface of articles derived from essentially linear crystallisable polyesters which provides a substantially permanent modification, very resistant towards washing, scouring, dry-cleaning, and other such processes, yet which does not involve the formation of new covalent bonds with the existing surface of the article.

In the specification of copending U.S. application of McIntyre et al., Ser. No. 370,068, filed May 25, 1964 now Patent 3,416,952 there is described a process for the treatment of shaped articles made from an essentially linear crystallisable polyester with a water-insoluble crystallisable polymeric compound, wherein said crystallisable polymeric compound, contains within a single molecule (A) sufficient repeat units identical with those forming the crystallisable portions of the polyester to confer crystallisability on the compound, and (B) at least one active group, the said crystallisable polymeric compound having a melting point above 100° C., measured by the temperature of disappearance of birefringence, and the said treatment being carried out by applying the crystallisable polymeric compound to the surface of the shaped article and subjecting the shaped article with the compound to a thermal treatment at a temperature above 90° C.

We have now found that the presence during the treatment of an agent capable of swelling the shaped article brings about certain improvements, including a reduction in the required effective treating temperature. A particular advantage of such a reduction in treating temperature is that the surface of a polyester shaped article may now be given a durable modification by treatment in an aqueous dispersion containing a crystallisable polymeric compound and a swelling agent, without the necessity for a separate high temperature baking operation. Fabrics derived from bulked polyester yarns which cannot be heated to high temperatures may therefore now also be given a more durable surface treatment by the present process.

Therefore, according to the present invention we provide a process for providing a shaped article made from an essentially linear crystallisable polyester with a durable, modified surface comprising treating the shaped article with a water-insoluble crystallisable polymeric compound, said polymeric compound being characterised in that (A) is has a crystalline melting point above 100° C., measured by the temperature of disappearance of birefringence, (B) it contains crystallisable segments of repeat units identical with the repeat units forming the crystallisable portions of the polyester shaped article, and (C) it contains at least one active group serving to modify the surface of the shaped article, the said active group being selected from at least one of the following: an acidic group, a basic group, an ionisable salt group, a water-solvatable polymeric group as defined, an anti-oxidant group, a group which absorbs ultra-violet light of wavelength 290–400 m$\mu$ and dissipates it in a manner harmless to the shaped article, a group which contains silicon- or fluorine-based water-repellent groups, a dyestuff group, a polymeric group containing a plurality of alcoholic hydroxyl radicals, and a polymeric group containing a plurality of —CO–NH— radicals; the process being carried out in the presence of a swelling agent for the polyester from which the shaped article is made.

In a preferred embodiment of the present invention we provide a stable dispersion of a copolymer solution in water said copolymer solution comprising a block or graft copolymer, containing crystalline polyester segments and polyoxyethylene segments, dissolved in one or more solvents of which at least one is a swelling agent for polyesters in their oriented crystalline form.

Suitable crystallisable polymeric compounds for the treatment are those given in copending application 370,068.

It will be appreciated that the shaped article may contain other materials, besides the polyester, for example it may be a fabric blend of oriented crystalline polyester fibres with cotton or wool fibres.

Essentially linear crystallisable polyesters which may be treated according to our invention include fibre- and film-forming polyesters and copolyesters derived from poly(ethylene terephthalate), poly(tetramethylene terephthalate), poly(1,4 - bis-methylenecyclohexane terephthalate), poly(ethylene naphthalene-2,6-dicarboxylate), and poly(ethylene diphenoxyethane-4,4'-dicarboxylate). In the case of poly(ethylene terephthalate) the crystallisable repeat unit has the structure

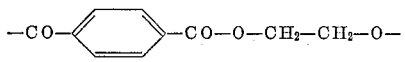

and in copolyesters containing ethylene terephthalate units the crystallisable repeat unit is the same provided that the proportion of ethylene terephthalate units is high enough. Polyesters and copolyesters containing at least 80 mole percent of poly(ethylene terephthalate) have proved especially successful commercially. Particular copolymers of poly(ethylene terephthalate) which have found some industrial application and to which this process may be applied include those in which adipate, sebacate, isophthalate, or sulphoisophthalate replace terephthalate; oxydiethylene or poly(oxyethylene) replace ethylene; p-oxyethoxybenzoate or p-oxybenzoate replace terephthalate; pentaerythritol, glycerol, or their derivatives are introduced to form chain-branching sites; or monoalkyl poly(oxyethylene) glycol is introduced to limit chain length. Poly(1,4-bismethylene-cyclohexane terephthalate) has also proved successful commercially. By the phrase "essentially linear" we mean that the polyester is either unbranched or exhibits a minor degree of chain branching insufficient to render the polyester insoluble in solvents which dissolve the unbranched polymer. The shaped polyester article is preferably treated in its oriented i.e. drawn, crystalline condition.

The active group present in the crystallisable polymeric compound can be either simple or polymeric, and may be present as an end group in the molecule or may be attached to other groups at one or more than one position. Of course, more than one active group may be present in the molecule of the crystallisable compound, and other groups which confer neither crystallisability nor surface modification may also be present.

The effect of incorporating an acidic group as an active group in the crystallisable polymeric compound is to render the surface of the shaped article receptive to basic materials such as basic polymers and copolymers or basic dyestuffs. The effect of incorporating a basic group as an active group in the crystallisable polymeric compound is to render the surface of the shaped article receptive to acidic materials, such as acidic polymers and copolymers or acid dyestuffs. Acidic or basic groups may be incorporated in the crystallisable polymeric compound in the form of their ionisable salts instead of as the un-neutralised acid or base.

The acidic group or salt thereof may be a relatively weak acid or a salt of a relatively weak acid, such as a carboxylic acid, or it may be a relatively strong acid or a salt of a relatively strong acid, such as a sulphonic or phosphonic acid. Strong acids and their salts are particularly effective in modifying the surface properties of shaped articles.

The acidic group or salt thereof may be derived from a monomeric material; thus for example the crystallisable compound may contain acidic end-groups, such as p-sulphobenzoic ester groups, or acidic difunctional groups such as 5-sulphoisophthalic ester groups. The acid group or salt thereof may be derived from a polymeric material, such as poly(ethylene 5-sulphoisophthalate). The crystallisable compound may be a block or graft copolymer.

In the case where the active group is a basic group or a salt of a basic group, it is preferred that the basic group is nitrogenous. The nitrogenous basic group or groups may be derived from a monomeric material; thus, for example, the crystallisable compound may contain basic end-groups, such as N,N-dimethyl hydrazide or dimethylaminoethyl ester end-groups, or basic difunctional groups such as N-methyldiethanol-amine ester groups. The nitrogenous basic group or groups may be derived from a polymeric material, such as polyethyleneimine or a poly (aminotriazole), in which case the crystallisable compound may be a block or graft copolymer. The nitrogenous basic group or groups may contain primary, secondary, tertiary, or quaternary basic groups.

The effect of incorporating a water-solvatable polymeric group is to render the surface of the shaped article hydrophilic and therefore wettable by water. Soil, particularly when attached to the shaped articles by oily substances is more easily displaced by water or aqueous detergents when the surface of the shaped article is rendered more hydrophilic, and the redeposition of soil from detergent media is also reduced. As a result, treated articles are washed more easily and more effectively than untreated articles. A further effect of incorporating a water solvatable group, is to increase the ability of adhesives, gums and sizes, including textile sizes to adhere to the shaped article surface. In the case of filament yarns such improvements in size adhesion enables the yarn to be used as weaving warps without first subjecting the yarns to a twisting operation.

By a water-solvatable polymeric group we mean a polymeric group derived from a water-soluble polymer of average molecular weight at least 300, except that in the case where the water-solvatable polymeric group is a polyoxyalkylene group, the polyoxyalkylene group is derived from a polyoxyalkylene glycol having an average molecular weight in the range 300 to 6,000 inclusive and the Viscosity Ratio of the crystallisable polymeric compound, as measured in a 1% solution in orthochlorophenol at 25° C., lies in the range of 1.1 to 1.5.

Thus for example polymeric groups derived from water-soluble polymers such as poly(vinyl alcohol), poly(vinyl methyl ether), poly(N,N-dimethyl acrylamide), methylcellulose, or hydroxyethyl cellulose are suitable for use as active groups. Polymeric groups derived from water-soluble poly(oxyalkylene) glycols are particularly suitable for use as active groups. Suitable polyoxyalkylene groups include polyoxyethylene, polyoxypropylene, polyoxytrimethyleen, polyoxytetramethylene, polyoxybutylene, and copolymers thereof.

Where the active group serving to modify the surface of the shaped article is a polyoxyethylene group, polyoxyethylene groups derived from polyoxyethylene glycols having an average molecular weight of 300-6000 are most suitable, and we particularly prefer to use polyoxyethylene groups derived from polyoxyethylene glycols having an average molecular weight in the range 1000 to 4000 inclusive. It will be appreciated that when we refer to polyoxyethylene groups derived from a particular polyoxyethylene glycol, this does not necessarily imply the use of that particular polyoxyethylene glycol in the preparation of the crystallisable polymeric compound but means that the polyoxyethylene group together with the elements of water is equivalent in molecular weight to that particular polyoxyethylene glycol; thus for example a polyoxyethylene group with a molecular weight of 282 is derived from a polyoxyethylene glycol of molecular weight 300.

It is a feature of our invention that it is not necessary that the crystallisable polymeric compound used in the treatment should itself be capable of forming shaped articles such as fibres or films, and indeed we prefer to use a crystallisable polymeric compound which is not itself capable of forming fibres, although crystallisable polymeric compounds which are capable of forming shaped articles can be used.

In the particular case where the active group is a polyoxyalkylene group, we use a crystallisable polymeric compound which is defined by a viscosity ratio, as measured in a 1% solution in orthochlorophenol at 25° C., in the range 1.1 to 1.5. No useful fibre- and film-forming properties are exhibited by the crystallisable polymeric compounds with the active groups and having viscosity ratios in this range. Crystallisable polymeric compounds having viscosity ratios above this range, although effective, are rather more difficult to disperse in aqueous media, and more difficult to handle in solution and in the molten state, than crystallisable polymeric compounds having viscosity ratios within our range.

Where the active group is a polyoxyethylene group, our crystallisable polymeric compounds preferably contain 10–50% by weight of ethylene terephthalate repeat units together with 90 to 50% by weight of polyoxyethylene terephthalate repeat units derived from a polyoxyethylene glycol of average molecular weight 1000 to 4000, the molar ratio of ethylene terephthalate units to polyoxyethylene terephthalate units being between 2:1 and 6:1.

The crystallisable polymeric compound may be a random copolymer, or it may be a block copolymer, or it may be a graft copolymer. In general, where the active group is itself polymeric, the crystallisable polymeric compound will be a block or graft copolymer, and where the active group is not polymeric the crystallisable polymeric compound will usually be a random copolymer, but may alternatively be a block or graft copolymer. Where the active group is not polymeric and appears only as end-groups in the crystallisable polymeric compound, the crystallisable polymeric compound is not strictly a copolymer at all, but rather a homopolymer with active end-groups.

It is of course possible to apply a crystallisable polymeric compound containing more than one active group, or to apply together or consecutively two or more crystallisable polymeric compounds containing different active groups.

Suitable swelling agents are selected by their ability to induce crystallisation in transparent amorphous polymer films made from the fibre-forming polyester. For example, a compound suitable as a swelling agent for poly(ethylene terephthalate) shaped articles at a given temperature can be observed visually to induce crystallisation in transparent amorphous poly(ethylene terephthalate) film when it is treated with the compound at the given temperature. Examples of compounds which are suitable in this invention as swelling agents for polyester shaped articles include benzaldehyde, benzyl alcohol, methyl salicylate, chloroform, trichloroethylene, o-dichlorobenzene, dimethyl phthalate, methylene chloride, diethyl oxalate, diethyl succinate, methyl iodide, tetrachloroethane, o-phenylphenol, 1-phenylethanol. Preferred swelling agents are o-phenylphenol, 1-phenylethanol, methyl salicylate and benzyl alcohol.

A suitable ratio of the weight of the crystallisable polymeric compound to the weight of the swelling agent is within the range 2:98 to 95:5.

A mixture of compounds of which at least one is a swelling agent for the shaped article may be used. The crystallisable polymeric compound and the swelling agent may be applied separately or together to the surface of the shaped article. The compounds and the swelling agent may be applied to the shaped article as molten material, as a solution, or as a suspension or dispersion in a liquid medium. We have found that a relatively simple and preferred method of applying the compound and the swelling agent is from a suspension or dispersion in an inert diluent or in water or an aqueous medium. An inert diluent which is not a swelling agent for the polyester shaped article may also be present in the disperse phase. The solution or dispersion of the crystallisable polymeric compound and the swelling agent may also contain dispersing or surface active agents, dyestuffs, optical brightening agents, dyeing assistants, or antioxidants.

In order to produce a durable surface treatment it is not essential to heat the crystallisable polymeric compound and the swelling agent in contact with the surface of the shaped article. Indeed the treatment can be carried out at room temperature. However, particularly when using a dispersion of a crystallisable polymeric compound and a swelling agent in water, we have found that the durability of the surface treatment towards washing, abrasion, etc., increases with the treatment temperature. We have found that it is useful to carry out the treatment at the temperatures normally used in dyeing polyester shaped articles, i.e., between 60° and 140° C.

In practice we have found it convenient to combine the surface treatment with a dyeing or optical brightening treatment of the polyester shaped article. In this case if the swelling agent acts as a dyeing assistant a separate dye carried may not be required. The aqueous dispersion of the crystallisable polymeric compound and the swelling agent may be added to the dyebath; however, since the presence of certain dyestuffs at high concentration appears sometimes to interfere with the surface treatment it is sometimes preferable to add the aqueous dispersion at a later stage, that is, when the concentration of dyestuff in the bath is low due to exhaustion on to the polyester shaped article. Under these conditions it is essential that the aqueous dispersion be stabilised by the use of at least one dispersing or surface active agent. Many dispersing agents are suitable for stabilising the aqueous dispersion of the crystallisable polymeric compound and the swelling agent at high temperatures. These include sodium salts of sulphonated castor oils, sodium salts of sulphonated alkyene naphthalenes, or dispersing agents based on alkyl ether phosphates. Protective colloids such as gelatine are also useful.

The following examples, in which all parts and percentages are by weight unless otherwise stated, illustrate but do not limit our invention.

EXAMPLE 1

This example illustrates a durable surface treatment of a fabric woven from poly(ethylene terephthalate) filament yarn wherein the treatment is carried out at room temperature and at 60° C. wtih a solution of a crystallisable polymeric compound in benzyl alcohol as the swelling agent for poly(ethylene terephthalate) drawn filament yarn.

Dimethyl terephthalate (194 parts) ethylene glycol (155 parts, poly (oxyethylene) glycol of average molecular weight 1540 (440 parts), 2,6-di-tert-butyl-4-methyl phenol (0.44 part), calcium acetate (0.1512 part) and antimony trioxide (0.0388 part) were heated from 194° C. to 234° C. over a period of 4½ hours during which time 57 parts of methanol were removed by distillation. Phosphorous acid (0.141 part of a 24.8% solution in ethylene glycol) was added and the molten material was transferred to a polymerization tube heated to 282° C. After the excess glycol had been blown off in a rapid stream of nitrogen the pressure was reduced to 0.1 mm. of mercury and polymerization was continued for 15 min. The resultant product (Viscosity Ratio 1.33 as measured on a 1% solution in orthochlorophenol at 25° C.) softened at 40–50° C. and melted as shown by final loss of crystallinity at 199–200° C.

A solution of 20% of this compound in benzyl alcohol was used as a padding bath in which 100% poly (ethylene terephthalate) taffeta fabric was immersed for 2 minutes; the temperature of the padding bath being maintained at room temperature for one fabric sample and at 60° C. for a second fabric sample. The fabrics were then drained of excess solution and rinsed in a mixture of acetone (10 parts) and water (90 parts) followed by rinsing in water. The fabrics were finally dried in a hot air tumble drier at 60° C.

The lengthwise resistances of 7" x 1½" samples of treated and untreated fabrics were measured at 65% relative humidity. The treated fabrics were then subjected to a series of 80 wash-dry cycles, each consisting of a 6 minute wash in a 0.07% solution of a commercial soap powder at 60° C. in a domestic washing machine, rinsing in water, 3 spin-dry treatments, and drying in a hot air tumble drier at 60° C. After the eightieth wash-dry cycle, the fabrics were rinsed in water of conductivity 1.5 x 10⁻³ mho, spin dried for 2 minutes, and tumble dried at 60° C. The lengthwise electrical resistances of samples 7″ x 1½″ were measured at 65% relative humidity. The following results were obtained.

|  | Resistance (megohms) | |
| --- | --- | --- |
|  | Padding bath at 60° C. | Padding bath at room temperature |
| Treated fabric, unwashed | 2.9×10³ | 6.7×10³ |
| Treated fabric, after 80 wash-dry cycles | 3.7×10⁴ | 1.4×10⁵ |
| Untreated fabric | 7×11⁶ | 7×10⁶ |

The treated fabrics after 80 wash dry cycles when rubbed against another poly(ethylene terephthalate) fabric in neither case developed a stable electrostatic charge, whereas a similar untreated fabric developed a heavy electrostatic charge when persisted for many seconds and caused dust, dirt, and ash to be attracted to the surface. The treated, washed fabrics were also readily wetted by water, and oil was displaced from the fabrics by water.

EXAMPLE 2

This example illustrates a durable surface treatment of a fabric woven from poly(ethylene terephthalate) filament yarn wherein the treatment is carried out at 60° C. with an aqueous dispersion of a crystallisable polymeric compound dissolved in benzaldehyde, which is a good swelling agent for poly(ethylene terephthalate).

The compound, prepared as described in Example 1, was dissolved in benzaldehyde to give a 10% solution. 10 parts by volume of this solution were dispersed in 190 parts by volume of water and the resulting emulsion used as a padding bath in which a 100% poly(ethylene terephthalate) taffeta fabric was treated for ½ minute at a padding bath temperature of 60° C. The fabric was then drained, rinsed, and dried as described in Example 1. The treated fabric, subjected to 40 wash-dry cycles as described in Example 1, developed no appreciably stable electrostatic charge when rubbed and was accordingly resistant to soiling. The treated, washed fabric was also readily wetted by water, and oil was readily displaced from the fabric by water. The treated fabric, so subjected to 40 wash-dry cycles and conditioned as described in Example 1, had a lengthwise (7″ x 1½″ sample) electrical resistance of 2.8×10³ megohms compared with 10⁷ megohms for untreated fabric.

EXAMPLE 3

This is a comparative example which illustrates that the surface treatment of poly(ethylene terephthalate) fabric is not durable when treatment is carried out at 60° C. with an aqueous dispersion of a crystallisable polymeric compound dissolved in ethyl benzoate which is a poor swelling agent for poly(ethylene terephthalate), but is durable when a good swelling agent, in this case o-phenylphenol, is added to the aqueous dispersion.

(i) The compound prepared as described in Example 1 was dissolved in ethyl benzoate to give a 10% solution. 40 parts by volume of this solution were dispersed in 160 parts by volume of water, and the resulting emulsion used as a padding bath in which a 100% poly(ethylene terephthalate) taffeta fabric was treated for 2 minutes at a padding bath temperature of 60° C. After draining, rinsing, drying, 10 wash-dry cycles, and conditioning as described in Example 1, the treated fabric had a lengthwise (7″ x 1½″ sample) electrical resistance of 1.4×10⁶ megohms.

(ii) A padding bath was prepared from 100 parts of an emulsion as prepared in section (i) of this example to which were added 0.5 part of the sodium salt of o-phenyl phenol and 1 part of glacial acetic acid. A 100% poly(ethylene terephthalate) taffeta fabric was treated with this padding bath and examined as described in Section (i) of this example except that the treated fabric was subjected to 40 wash-dry cycles.

The washed, treated fabric had a lengthwise (7″ x 1½″ sample) electrical resistance of 2.3×10⁴ megohms, and when rubbed against another 100% poly(ethylene terephthalate) fabric developed no appreciably stable electrostatic charge and was accordingly resistant to soiling. The treated washed fabric was also wetted by water, and oil was readily removed from the fabric by water.

EXAMPLE 4

This illustrates the durable treatment of fabric comprising poly(1,4-bismethylene cyclohexane terephthalate) fibres and wool using a crystallisable polymeric compound in which the crystallisability is due to 1,4-bismethylenecyclohexane terephthalate units, and the comparative example illustrates that the treatment is not effective using a crystallisable polymeric compound in which the crystallisability is due to ethylene terephthalate units. Both examples illustrate treatment at 60° C. in presence of chloroform which is a good swelling agent for poly(1,4-bismethylenecyclohexane terephthalate).

Dimethyl terephthalate (97 parts), 1,4-bishydroxymethyl cyclohexane (51.5 parts), poly(oxyethylene) glycol of average molecular weight 1540 (220 parts), and tetra-butyl titanate (0.074 part) were heated under atmospheric pressure 272° C. until the theroretical volume of methanol had been evolved. The resultant product (viscosity ratio 1.16 as measured on a 1% solution in orthochlorophenol at 25° C.) melted (as shown by final loss of birefringence) at 248° C. The product was dissolved in chloroform to give a 10% solution. A woven fabric comprising 55% poly(1,4 - bismethylenecyclohexane terephthalate) and 45% wool was treated with this solution by the method described in Example 1 except using treating conditions of 60° C. for 10 minutes. The treated fabric, after being subjected to 40 wash-dry cycles and conditioned as described in Example 1, had a lengthwise (7″ x 1½″ sample) electrical resistance of 4.6×10⁴ megohms.

COMPARATIVE EXAMPLE 4A

The compound, prepared as described in Example 1, was dissolved in chloroform to give a 10% solution. A woven fabric comprising 55% poly(1,4 - bismethylenecyclohexane terephthalate) and 45% wool was treated with this solution by the procedure described in Example 1 except that the treating conditions were 60° C. for 10 mintues. The treated fabric, after subjecting to 10 wash-dry cycles and conditioning as described in Example 1, had a lengthwise (7″ x 1½″ sample) electrical resistance of 2.0×10⁶ megohms. The fabric was difficult to wet by water and soiled in the same way as untreated fabric, thus illustrating that, even in the presence of a good swelling agent, the treatment is not effective when the repeating units causing crystallinity in the compound used for the treatment (in this case, ethylene terephthalate units) are not the same as the units producing crystallinity in the article treated (in this case, 1,4-bismethylenecyclohexane terephthalate units).

EXAMPLE 5

This example illustrates a durable surface treatment of a 100% poly(ethylene terephthalate) fabric wherein the treatment is carried out during dyeing at 130° C. using a dyebath additive comprising an aqueous dispersion of a solution of a poly(ethylene terephthalate)—poly(oxyethylene) terephthalate copolymer in 1-phenylethanol.

The compound, prepared as described in Example 1, was dissolved in 1-phenyl ethanol to give a 40% solution. To 140 parts of this solution were added 32 parts of an 83% aqueous solution of Turkey Red Oil. The resulting composition, heated to 50° C., was added with stirring to a solution of gelatine (16 parts) in water (212 parts) also at 50° C. The resulting dispersion was passed through a Manton-Gaulin homogeniser then stirred until cool.

A dyebath was prepared by adding 0.33 part of C.I. Disperse Blue 26, 0.075 part of the disodium salt of methylene dinaphthalene sulphonic acid as a 25% aqueous solution, and 3 parts of the dispersion prepared as above to 100 parts of water. A 100% poly(ethylene terephthaate) plain weave fabric was dyed at 130° C. for 1 hour in the above dyebath using a liquor ratio of 30:1. The fabric, so treated, when subjected to 40 wash-dry cycles as described in Example 1, developed no appreciably stable, electrostatic charge when rubbed and was accordingly resistant to soiling. The treated, washed fabric was also readily wetted by water, and oil was readily displaced from the fabric by water. The treated fabric, so subjected to 40 wash-dry cycles and conditioned as described in Example 1, had a lengthwise (7″ x 1½″ sample) electrical resistance of $6.6 \times 10^4$ megohms compared with $5.5 \times 10^6$ megohms for untreated dyed fabric.

EXAMPLE 6

This example illustrated a durable surface treatment of a fabric derived from a bulked poly(ethylene terephthalate) yarn wherein the treatment is carried out at 95° C. by adding an aqueous dispersion of a solution of a poly(ethylene terephthalate)—poly(oxyethylene) terephthalate copolymer in 1-phenylethanol to a dyebath subsequent to the dyeing process.

A dyebath was prepared by adding 0.035 part of C.I. Disperse Blue 56, 0.075 part of the disodium salt of methylene dinaphthalene sulphonic acid (as a 25% aqueous solution), and 0.5 part of a 30% aqueous solution of acetic acid to 100 parts of water. A fabric knitted from a stabilised false twist crimped poly(ethylene terephthalate) yarn was placed in the dyebath using a liquor ratio of 30:1. The dyebath was now heated to 95° C. and 0.35 part of the sodium salt of o-phenyl phenol, dissolved in a small volume of water, were added during a period of 20 minutes. The temperature of the bath was maintained at 95° C. for 1½ hours after the final addition of the sodium salt of o-phenyl phenol then 8 parts of the dispersion prepared as described in Example 5 were added to the dyebath (200 parts). The temperature was maintained at 95° C. for a further 15 minutes. Gentle agitation was maintained throughout the above processes. The fabric so treated, after being subjected to 20 wash-dry cycles as described in Example 1, developed no appreciably stable electrostatic charge when rubbed and was accordingly resistant to soiling. The treated, washed fabric was also readily wetted by water, and oil was readily displaced from the fabric by water. The treated fabric, so subjected to 20 wash-dry cycles and conditioned as described in Example 1, had a lengthwise (7″ x 1½″ sample) electrical resistance of $5.7 \times 10^5$ megohms compared with $5 \times 10^6$ megohms for untreated, dyed fabric.

EXAMPLE 7

This example illustrates a durable surface treatment of biaxially orientated poly(ethylene terephthalate) film to render it antistatic and thus to reduce its propensity for attracting dust.

The compound, prepared as described in Example 1, was dissolved in chloroform to give a 10% solution. The solution was used as a treating bath in which a strip of biaxially oriented poly(ethylene terephthalate) film was immersed for 5 minutes at 35° C. the treated film, even after scouring in 0.07% Persil solution at 50° C. for 1 hour, developed no appreciably stable electrostatic charge when rubbed and accordingly did not attract dust.

EXAMPLE 8

This example illustrates the treatment of a poly(ethylene terephthalate) monofilament to render its surface hydrophilic.

The compound, prepared as described in Example 1, was dissolved in benzyl alcohol to give a 15% solution. This solution was used as a treating bath in which a length of poly(ethylene terephthalate) monofilament of diameter 0.006 inch was immersed for 3 minutes at 60° C. The treated monofilament was washed in 20% aqueous methanol then dried in a current of warm air.

Samples of treated and of untreated monofilament were immersed in oily matter then in water. The oily matter was spontaneously displaced by water from the treated sample but could not be displaced from the untreated sample even under conditions of vigorous agitation.

What we claim is:

1. A process for providing a shaped article made from an essentially linear crystallizable polyester with a durable modified surface comprising contacting the shaped article at a temperature between room temperature and 140° C. with a composition consisting essentially of a water-insoluble crystallizable polymeric compound, said polymeric compound (A) haivng a crystalline melting point above 100° C., measured by the temperature of disappearance of birefringence, (B) containing crystallizable segments of repeat units identical with the repeat units forming the crystallizable portions of the polyester shaped article, and (C) containing at least one active group serving to modify the surface of the shaped article, the said active group being: an acidic group, a basic group, an ionizable salt group, a water-solvatable polymeric group of average molecular weight at least 300, an anti-oxidant group, a group which absorbs ultra-violet light of wavelength 290–400 m$\mu$ and dissipates it in a manner harmless to the shaped article, a group which contains silicon- or fluorine-based water-repellent groups, a dyestuff group, a polymeric group containing a plurality of alcoholic hydroxyl radicals, or a polymeric group containing a plurality of —CO—NH— radicals; and a swelling agent for the polyester from which the shaped article is made.

2. A process according to claim 1 wherein the crystalisable polyester segments of repeat units in the crystallisable polymeric compound are poly(ethylene terephthalate) segments.

3. A process according to claim 1, wherein the crystallisable polyester segments of repeat units in the crystallisable polymeric compound are poly(1,4-bismethylenecyclohexane terephthalate) segments.

4. A process according to claim 1, wherein the crystallisable polyester segments of repeat units in the crystallisable polymeric compound are poly(ethylene-1,2-diphenoxyethane-4,4′-dicarboxylate) segments.

5. A process according to claim 1 wherein the crystallizable polymeric compound has more than one active group in the molecule.

6. A process according to claim 1 wherein the crystallizable polymeric compound contains at least one active group which is an acidic group selected from the group consisting of carboxylic acid, sulphonic acid, and phosphonic acid groups and salts of the said acids, which are compatible with the swelling agent.

7. A process according to claim 1 wherein the crystallizable polymeric compound contains nitrogenous basic groups.

8. A process according to claim 1 wherein at least one active group is a water-solvatable polyoxyalkylene group selected from the group consisting of polyoxyethylene, polyoxypropylene, and copolymers thereof.

9. A process according to claim 1 wherein the active group is a water-solvatable polyoxyalkylene group derived from a polyoxyalkylene glycol having an average molecular weight in the range 300 to 6,000 inclusive and the crystallizable polymeric compound has a viscosity ratio as measured at 25° C. in a 1% solution in orthochlorophenol of between 1.1 and 1.5.

10. A process according to claim 1 wherein the crystallizable polyester repeat units are ethylene terephthalate units, the crystallizable polymeric compound contains 10–50% by weight of ethylene terephthalate units together with 90–50% by weight of polyoxyethylene terephthalate units, and the molar ratio of ethylene terephthalate units to polyoxyethylene terephthalate units in the crystallizable polymer compound is between 2:1 and 6:1.

11. A process according to claim 1 wherein the polyoxyethylene group is derived from a polyoxyethylene glycol having an average molecular weight between 1,000 and 4,000 inclusive.

12. A process according to claim 1 where the swelling agent is a member of the group consisting of 1-phenylethanol, benzyl alcohol, methyl salicyclate and o-phenylphenol.

13. A process according to claim 1 wherein the treatment is carried out in the presence of a mixture of solvents of which at least one is the swelling agent for the polyester shaped article.

14. A process according to claim 1 wherein the crystallizable polymeric compound and the swelling agent are applied as molten material.

15. A process according to claim 1 wherein the crystallizable polymeric compound and the swelling agent are applied from a dispersion in an aqueous medium.

16. A process according to claim 15 wherein the treatment of the shaped article with the crystallizable polymeric compound and the swelling agent is combined with a dyeing treatment of the shaped article at a temperature between 60° C. and 140° C. inclusive.

17. A process according to claim 15 wherein the dispersion contains at least one dispersing agent or surface active agent, dyeing assistant or antioxidant.

18. A process as set forth in claim 1 in which the composition with which the shaped article is contacted also contains an optical brightening agent.

References Cited

UNITED STATES PATENTS

| | | | |
|---|---|---|---|
| 2,748,027 | 5/1956 | Meier | 117—138.8 X |
| 3,034,920 | 5/1962 | Waller et al. | 117—138.8 X |
| 3,136,655 | 6/1964 | Wolinski | 117—138.8 X |
| 3,137,668 | 6/1964 | Kuppers | 8—130.1 X |
| 3,152,920 | 10/1964 | Caldwell et al. | 117—138.8 |
| 3,284,232 | 11/1966 | Caldwell | 117—138.8 |
| 3,309,222 | 3/1967 | Caldwell | 117—138.8 |

OTHER REFERENCES

Golding, Polymers and Resins, Van Norstrand Co., 1959 pp. 134–145.

WILLIAM D. MARTIN, Primary Examiner

J. E. MILLER, Assistant Examiner

U.S. Cl. X.R.

8—130.1; 117—139.5, 161, 33.5